THOMAS MAYOR.
Improvement in Speeders for Spinning and Twisting Roving.
No. 4,921. Reissued May 28, 1872.
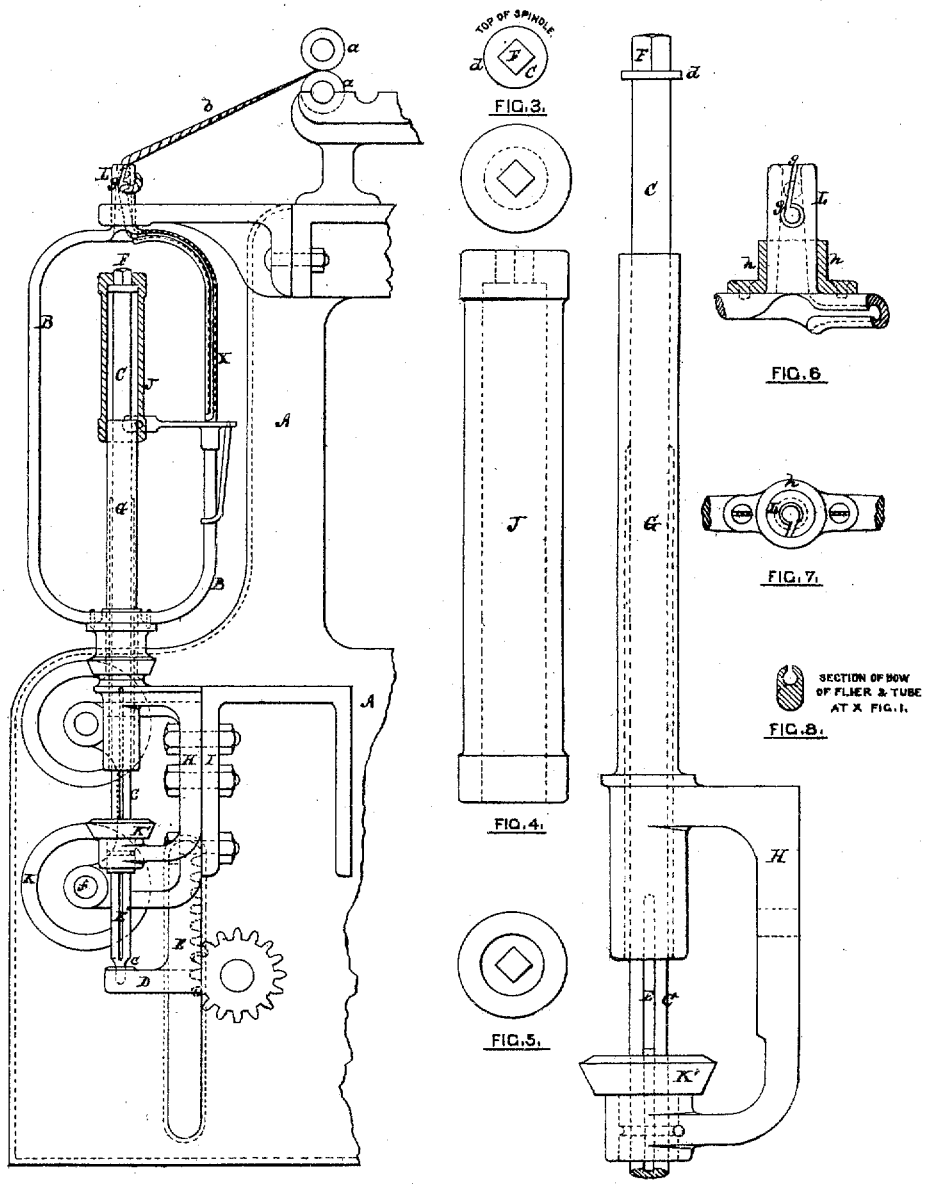
WITNESSES.
Peter F. Hughes
A. Judson Crushing
INVENTOR:
Thomas Mayor
per B. F. Thurston atty
AM. PHOTO-LITHOGRAPHIC CO. N.Y. (OSBORNE'S PROCESS.)

UNITED STATES PATENT OFFICE.

THOMAS MAYOR, OF PROVIDENCE, R. I., ASSIGNOR, BY MESNE ASSIGNMENTS, TO HIMSELF AND GEORGE CHATTERTON, OF SAME PLACE.

IMPROVEMENT IN SPEEDERS FOR SPINNING AND TWISTING ROVING.

Specification forming part of Letters Patent No. 92,859, dated July 20, 1869; reissue No. 4,921, dated May 28, 1872.

*To all whom it may concern:*

Be it known that I, THOMAS MAYOR, of the city and county of Providence, in the State of Rhode Island, have invented a certain new and useful Improvement in Speeders for Spinning and Twisting Roving; and I do hereby declare that the following specification, taken in connection with the drawing making a part of the same, is a full, clear, and exact description thereof.

Figure 1 is an end view of a portion of the machine. Fig. 2 is a view of one of the spindles and its bolster. Figs. 3, 4, and 5 are views of the peculiar bobbin employed. Figs. 6, 7, and 8 are views of the flier.

A, Fig. 1, represents a portion of the frame. *a a* are feeding-rollers delivering the roving *b* to the flier B. The spindle is shown at C, and upon a larger scale at Fig. 2. It is stepped at *c*, Fig. 1, in a foot-rest, D, projecting from the lifting-rail E, which rail it is to be supposed is made to traverse by any suitable mechanism in some one of the ways in use. The spindle is peculiar in its construction in this: Its upper end is furnished with a square, F, and flange *d*, in order to furnish a means for driving the bobbin by the application of the driving power to its upper instead of to its lower end. It is not essential that this precise form should be given to the end of the spindle, and any mechanical construction which will effect the driving of the bobbin at this point will enable the invention which results from such application of the driving power to be employed. The spindle is mounted in a long stationary bolster or tube, G, which may be cast in one piece with the yoke H, which latter is firmly bolted, as seen in Fig. 1, to a girt, I, running from end to end of the frame. This yoke H furnishes a stationary support for the bolster-tube G; and the interior of this latter should be constructed with a bearing for the spindle near its upper end, as shown at Figs. 1 and 2. The spindle is driven by the bevel-gear K, which engages with the bevel-gear K′, connected with the spindle by means of the long feather *e* fitted to slide through the hub of K′, as the spindle is lifted and lowered by the traverse-rail E. The bobbin J is of the usual length, but its axis is bored out so as to fit the bolster, and its head is closed all but a square opening into which the squared end of the spindle fits. When the bobbin is placed upon the spindle its head will rest upon the flange *d*, and be supported by it while its lower end (the bobbin being longer than the length of the spindle above the bolster) will take a bearing against the outside of the bolster, as seen at Fig. 1, and therefore incase both the spindle and the end of the bolster. The necessary result of this method of driving the bobbin and combining it with the bolster, is to insure almost perfect steadiness of movement to the bobbin, notwithstanding that it is made to traverse to the extent of its length past the end of the flier-arm by the movement of the lifting-rail, there being at all times a bearing for it at both of its ends, and the upper bearing of the spindle being at all times within some portion of the bobbin. As an incident, too, of this manner of constructing the bobbin, nearly all dust and particles of cotton are excluded from entering the bolster in consequence of the protection which the bobbin affords. As previously stated, the spindle is driven by the bevel-gear K. This arrangement enables the driving-gear K to be mounted upon a shaft, *f*, Fig. 1, extending from end to end of the frame, and elevated above the foot-bearings of the spindles, and in front of the line of spindles. The yoke H, to which the long bolster is attached, is formed at its lower extremity into a collar, through which the spindle passes, and which can serve as a bearing for the spindle between the foot-bearing and the upper bearing in the tube G. This intermediate collar affords a bracket-rest for the bevel-gear K′. The gear K′ is by this arrangement enabled to be placed with its bevel-face downward, and the fellow bevel-gear K can thereby be located nearer the floor than would be practicable were a rail employed. Consequently the height of the machine by this change in the customary location and arrangement of the driving-gear is materially reduced, and the usual raised platform for the operator to stand upon to reach the bobbin is dispensed with. Moreover this arrangement of the driving-gear greatly simplifies the structure of the machine, reduces the length of the spindle and its extent of traverse. It is easily accessible, not readily deranged, and is peculiarly adapted to a machine employing a double row of spindles. The neck L of the flier is constructed with the usual axial hole, and also with two lateral orifices, one above the other, in opposite sides of the neck leading into the axial hole, as described in the Letters Patent granted to me March 21, 1865. The additional improvement consists in connecting the axial hole through the neck of the flier with the lower one of the two orifices through the side of the neck by a slit, *g*. The object of this is not only to make it more convenient for the operator to piece up broken ends, either from above or from below, but also to furnish a device for breaking the yarn in case the roving has not been properly conducted to the flier by being entered into the axial hole then led through the uppermost of the two lateral orifices, and then wound partially around the outside of the neck and entered into the lower orifice, as it should in order to insure its being properly twisted. So long as the roving is conducted to the flier in this path, the slit *g* will not produce any effect; but if by neglect the roving has not been put through both holes, as described, it will work into the slit and be instantly broken. I have found it advisable to surround the neck of the flier at the upper bearing with a collar or bushing, *h*, which may be of cast-iron, mineral, glass, or other suitable material, and which is made removable from the flier, so that it can readily be replaced when it has become worn.

The machine hereinbefore described can be constructed without radical alteration to work, either as a speeder or as a flier-frame, and speeders of the old forms in use can be readily changed so as to employ the means of driving the bobbin, and the arrangement to insure its steadiness of movement above described.

Having described the machine shown in the drawing, I declare that I am aware of the fact that a long tube containing an elevated bearing for the spindle has been before my invention used in combination with an open leg or "fly-frame" flier; but never, to my knowledge, other than with a lifting-rail in combination with such tube and flier, and thereby such machines were incapable of running practically well at high speed. My improvement, therefore, in this respect consists in so organizing and arranging the machine that the tube and elevated bearing for the spindle shall be a fixture.

What I claim as my invention, and desire to secure by Letters Patent, is—

1. The combination of a reciprocating live spindle with a bow-flier and an upwardly-extending tube or bolster, G, provided near its upper end with a bearing for the spindle, substantially as described.

2. The method, substantially as herein specified, of driving and steadying a bobbin, by combining the bobbin J with the driving-spindle C and the stationary bolster G, so that while the bobbin is driven by the former it shall in all positions be steadied by the latter, as herein set forth and described.

3. The flier-neck L, provided with the two lateral orifices for the passage of the roving, as described, and the slit *g* connecting the axial hole with the lower one of said lateral orifices, for the purpose of breaking the roving or yarn whenever it has not been properly led to the flier.

4. The arrangement of the gearing for driving the fliers and that for driving the spindles upon two parallel lines of shafting, one of which is directly geared with the fliers, and the other in the same manner with the spindles, and both of which are mounted in bearings which are stationary and rigidly attached to the frame of the machine, substantially as described.

THOMAS MAYOR.

Witnesses:

A. J. CUSHING,

PETER F. HUGHES.